United States Patent
Zou

(10) Patent No.: US 10,756,901 B2
(45) Date of Patent: Aug. 25, 2020

(54) BLOCKCHAIN-BASED IDENTITY AUTHENTICATION METHOD, APPARATUS, AND DEVICE

(71) Applicant: ALIBABA GROUP HOLDING LIMITED, Grand Cayman (KY)

(72) Inventor: Xueqing Zou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/835,487

(22) Filed: Mar. 31, 2020

(65) Prior Publication Data

US 2020/0244460 A1 Jul. 30, 2020

Related U.S. Application Data

(63) Continuation of application No. PCT/CN2020/071680, filed on Jan. 13, 2020.

(30) Foreign Application Priority Data

Aug. 1, 2019 (CN) .......................... 2019 1 0708243

(51) Int. Cl.
*H04L 9/32* (2006.01)
*H04L 9/06* (2006.01)

(52) U.S. Cl.
CPC .......... *H04L 9/3231* (2013.01); *H04L 9/0637* (2013.01); *H04L 9/3297* (2013.01)

(58) Field of Classification Search
CPC ............. H04L 2209/38; H04L 63/0861; H04L 9/0637; H04L 9/3231; H04L 12/1831;
(Continued)

(56) References Cited

U.S. PATENT DOCUMENTS 9,331,856 B1 5/2016 Song
9,635,000 B1 4/2017 Muftic
(Continued)

FOREIGN PATENT DOCUMENTS

CN 106446266 A 2/2017
CN 107786547 A 3/2018
(Continued)

OTHER PUBLICATIONS

First Search for Chinese Application No. 201910708243.3 dated May 13, 2020.
(Continued)

*Primary Examiner* — Abiy Getachew
(74) *Attorney, Agent, or Firm* — Sheppard Mullin Richter & Hampton LLP

(57) ABSTRACT

Embodiments of the specification provide a blockchain-based identity authentication method, apparatus, and device. An exemplary method includes: obtaining a user identity authentication request, the user identity authentication request comprising first to-be-authenticated biometric feature information of a user and to-be-authenticated identity information of the user; querying, through a first smart contract in a blockchain, biometric feature information based on the to-be-authenticated identity information in a user identity data node in the blockchain; determining, through the first smart contract, whether the biometric feature information is consistent with the first to-be-authenticated biometric feature information; if yes, generating an authentication result; generating, through a second smart contract, a user identity authentication record comprising the first to-be-authenticated biometric feature information, the to-be-authenticated identity information, and the authentication result; and storing the user identity authentication record into the blockchain.

17 Claims, 5 Drawing Sheets

(58) Field of Classification Search
CPC .......... H04L 2209/56; H04L 63/0428; H04L 63/123; H04L 9/0643; H04L 9/3236; H04L 9/3239; H04L 9/3247; H04L 9/3297; H04L 9/0825; H04L 9/0866; H04L 63/0823; G06F 21/32; G06F 21/602; G06F 21/645; G06F 21/64; G06F 21/35; G06F 21/45; G06F 21/6245; G06Q 10/109; G06Q 50/18; G06Q 20/02; G06Q 20/065; G06Q 20/102; G06Q 20/24; G06Q 20/40; G06Q 2220/00; G06Q 20/3224; G06Q 20/382; G06Q 20/40145; G06Q 20/405; H04W 4/023; H04W 12/06
See application file for complete search history.

(56) References Cited

U.S. PATENT DOCUMENTS

| | | | |
|---|---|---|---|
| 9,916,432 | B2 | 3/2018 | Bower et al. |
| 2017/0111385 | A1 | 4/2017 | Madhu et al. |
| 2017/0140408 | A1 | 5/2017 | Wuehler |
| 2017/0149560 | A1 | 5/2017 | Shah |
| 2017/0177855 | A1 | 6/2017 | Faidella et al. |
| 2017/0206532 | A1 | 7/2017 | Choi |
| 2017/0230375 | A1 | 8/2017 | Kurian |
| 2017/0310653 | A1 | 10/2017 | Zhang |
| 2018/0025166 | A1 | 1/2018 | Daniel et al. |
| 2018/0108024 | A1 | 4/2018 | Greco et al. |
| 2018/0152297 | A1 | 5/2018 | Fielding et al. |
| 2018/0294966 | A1 | 10/2018 | Hyun et al. |
| 2018/0331837 | A1 | 11/2018 | Uhr et al. |
| 2019/0007402 | A1 | 1/2019 | Andrade |

FOREIGN PATENT DOCUMENTS

| | | | |
|---|---|---|---|
| CN | 108805573 | A | 11/2018 |
| CN | 109067541 | A | 12/2018 |
| CN | 109327481 | A | 2/2019 |
| CN | 109409136 | A | 3/2019 |
| CN | 109583184 | A | 4/2019 |
| CN | 109889479 | A | 6/2019 |
| CN | 110032846 | A | 7/2019 |
| CN | 110049060 | A | 7/2019 |

OTHER PUBLICATIONS

Supplementary Search for Chinese Application No. 201910708243.3 dated May 13, 2020.
Supplementary Search for Chinese Application No. 201910708243.3 dated Jun. 19, 2020.

BLOCKCHAIN-BASED IDENTITY AUTHENTICATION METHOD, APPARATUS, AND DEVICE

CROSS REFERENCE TO RELATED APPLICATIONS

This application is a continuation application of International Patent Application No. PCT/CN2020/071680, filed on Jan. 13, 2020, which claims priority to Chinese Patent Application No. 201910708243.3, filed on Aug. 1, 2019. The entire content of the above referenced applications are incorporated herein by reference.

TECHNICAL FIELD

The specification relates to the field of computer technologies, and in particular, to a blockchain-based identity authentication method, apparatus, and device.

BACKGROUND

At present, in many business scenarios, identity authentication needs to be performed on a user. For example, before the user performs a payment operation, the identity authentication needs to be performed on the user through fingerprints, iris, etc. Before the user uses mobile banking to perform a transfer operation, the identity authentication needs to be performed on the user through a key, an authentication code, etc. Various information is related to the identity authentication process, for example, biometric feature information used for authentication. Because the related information in the identity authentication process is a key evidence of identity authentication and needs to be stored for attestation, it is necessary to provide a technical solution to solve the problem of how to store the related information involved in the identity authentication process.

SUMMARY

Embodiments of the specification are intended to provide a blockchain-based identity authentication method, apparatus, and device, so that related information in the identity authentication process can be stored in the blockchain for attestation, and authenticity and validity of the stored information can be ensured by utilizing the tamper resistance feature of the blockchain.

In order to achieve the foregoing technical objectives, the embodiments of the specification are implemented as follows.

An embodiment of the specification provides a blockchain-based identity authentication method, including: obtaining a user identity authentication request, the user identity authentication request comprising first to-be-authenticated biometric feature information of a user and to-be-authenticated identity information of the user; querying, through a first smart contract in a blockchain, biometric feature information based on the to-be-authenticated identity information in a user identity data node in the blockchain; obtaining, through the first smart contract, an authentication result by determining whether the biometric feature information is consistent with the first to-be-authenticated biometric feature information; if the biometric feature information is consistent with the first to-be-authenticated biometric feature information, generating, through a second smart contract, a user identity authentication record comprising the first to-be-authenticated biometric feature information, the to-be-authenticated identity information, and the authentication result; and storing the user identity authentication record into the blockchain.

An embodiment of the specification provides a system for blockchain-based identity authentication, comprising one or more processors and one or more non-transitory computer-readable memories coupled to the one or more processors and configured with instructions executable by the one or more processors to cause the system to perform operations comprising: obtaining a user identity authentication request, the user identity authentication request comprising first to-be-authenticated biometric feature information of a user and to-be-authenticated identity information of the user; querying, through a first smart contract in a blockchain, biometric feature information based on the to-be-authenticated identity information in a user identity data node in the blockchain; obtaining, through the first smart contract, an authentication result by determining whether the biometric feature information is consistent with the first to-be-authenticated biometric feature information; if the biometric feature information is consistent with the first to-be-authenticated biometric feature information, generating, through a second smart contract, a user identity authentication record comprising the first to-be-authenticated biometric feature information, the to-be-authenticated identity information, and the authentication result; and storing the user identity authentication record into the blockchain.

An embodiment of the specification provides a non-transitory computer-readable storage medium for blockchain-based identity authentication, configured with instructions executable by one or more processors to cause the one or more processors to perform operations comprising: obtaining a user identity authentication request, the user identity authentication request comprising first to-be-authenticated biometric feature information of a user and to-be-authenticated identity information of the user; querying, through a first smart contract in a blockchain, biometric feature information based on the to-be-authenticated identity information in a user identity data node in the blockchain; obtaining, through the first smart contract, an authentication result by determining whether the biometric feature information is consistent with the first to-be-authenticated biometric feature information; if the biometric feature information is consistent with the first to-be-authenticated biometric feature information, generating, through a second smart contract, a user identity authentication record comprising the first to-be-authenticated biometric feature information, the to-be-authenticated identity information, and the authentication result; and storing the user identity authentication record into the blockchain.

In the embodiments of the specification, the first blockchain node first obtains the user identity authentication request, then calls a pre-deployed first smart contract according to the user identity authentication request, performs identity authentication on the to-be-authenticated user through the first smart contract to obtain authentication result information, then calls a pre-deployed second smart contract according to the authentication result information, the biometric feature information of the to-be-authenticated user, and the to-be-authenticated identity information, generates the user identity authentication record through the second smart contract, and finally stores the user identity authentication record into the blockchain for attestation. It may be learned that, according to the embodiment of the specification, identity authentication can be performed on the user through smart contracts in the blockchain, and the user identity authentication record is stored in the blockchain, thereby storing related information in the identity authentication process into the blockchain in the form of user identity authentication record for attestation, so that authenticity and validity of the stored information can be ensured by virtue of the tamper resistance feature of the blockchain.

BRIEF DESCRIPTION OF THE DRAWINGS

To describe the technical solutions in the embodiments of the specification or in the existing technologies more clearly, the following briefly describes the accompanying drawings required for describing the embodiments or the existing technologies. Apparently, the accompanying drawings in the following description merely show some embodiments recorded in the specification, and a person of ordinary skill in the art may still derive other drawings from these accompanying drawings without creative efforts.

DETAILED DESCRIPTION OF THE INVENTION

To enable a person skilled in the art to better understand the technical solutions of this application, the technical solutions of the embodiments of this application will be described clearly and thoroughly below with reference to the accompanying drawings of the embodiments of this application. All other embodiments obtained by a person of ordinary skill in the art based on the embodiments of this application without creative efforts shall fall within the protection scope of this application.

Embodiments of the specification are intended to provide a blockchain-based identity authentication method, apparatus, and device, so that related information in the identity authentication process can be stored in the blockchain for attestation, and authenticity and validity of the stored information can be ensured by utilizing the tamper resistance feature of the blockchain.

Figure 1:
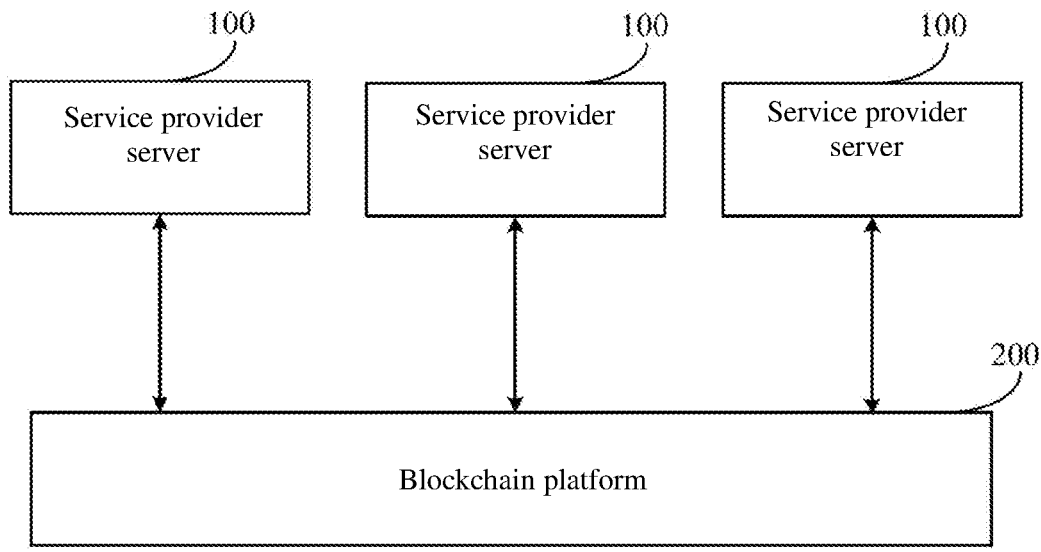
FIG. 1 is a schematic diagram of a scenario of a blockchain-based identity authentication method, according to an embodiment of the present specification.

FIG. 1 is a schematic diagram of a scenario of a blockchain-based identity authentication method, according to an embodiment of the specification. As shown in FIG. 1, the scenario may include one or more service provider servers 100 and a blockchain platform 200, the service provider server 100 performing data communication with the blockchain platform 200. In FIG. 1, the service provider server 100 is configured to send a user identity authentication request to the blockchain platform 200, and the blockchain platform 200 is configured to perform identity authentication on a user according to the user identity authentication request to obtain authentication result information. The blockchain platform 200 is further configured to generate a user identity authentication record according to the authentication result information, and store the user identity authentication record into a blockchain for attestation. In the scenario shown in FIG. 1, related information in the identity authentication process can be stored in the blockchain in the form of the user identity authentication record for attestation, so that authenticity and validity of the stored information can be ensured by utilizing the tamper resistance feature of the blockchain.

The foregoing application scenario in FIG. 1 is shown only to facilitate understanding of the spirit and principles of the embodiment of the specification, and the embodiment of the specification is not limited in this regard. Conversely, the embodiments of the specification may be applied to any applicable scenario.

Figure 2:
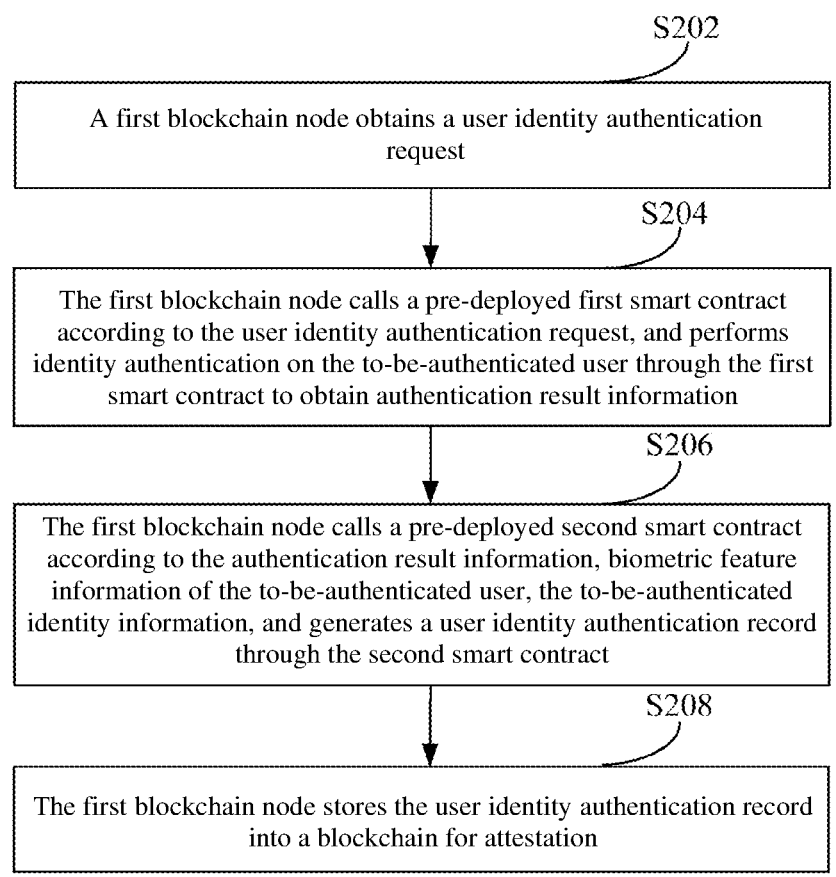
FIG. 2 is a schematic diagram showing a process of a blockchain-based identity authentication method, according to an embodiment of the specification.

FIG. 2 is a schematic diagram showing a process of a blockchain-based identity authentication method, according to an embodiment of the present specification. The method can be applied to the blockchain platform 200 in FIG. 1 and performed by a first blockchain node in the blockchain platform 200. As shown in FIG. 2, the process may include the following steps.

In step S202, obtaining, by a first blockchain node, a user identity authentication request, the user identity authentication request including to-be-authenticated biometric feature information of a to-be-authenticated user and to-be-authenticated identity information.

In step S204, calling, by the first blockchain node, a pre-deployed first smart contract according to the user identity authentication request, and performing identity authentication on the to-be-authenticated user through the first smart contract to obtain authentication result information of the user.

In step S206, calling, by the first blockchain node, a pre-deployed second smart contract according to the authentication result information, biometric feature information of a to-be-authenticated user, and the to-be-authenticated identity information, and generating a user identity authentication record through the second smart contract.

In step S208, storing, by the first blockchain node, the user identity authentication record into a blockchain for attestation.

In some embodiments, the first blockchain node first obtains the user identity authentication request, then calls the pre-deployed first smart contract according to the user identity authentication request, to perform identity authentication on the to-be-authenticated user through the first smart contract to obtain authentication result information, then calls the pre-deployed second smart contract according to the authentication result information, the biometric feature information of the to-be-authenticated user, and the to-be-authenticated identity information, to generate the user identity authentication record through the second smart contract, and finally stores the user identity authentication record into the blockchain for attestation. This way, the identity authentication may be performed on the user through smart contracts in the blockchain, and the user identity authentication record is stored in the blockchain, thereby storing related information in the identity authentication process into the blockchain in the form of user identity authentication record for attestation, so that authenticity and validity of the stored information can be ensured by utilizing the tamper resistance feature of the blockchain.

In the foregoing step S202, the first blockchain node obtains the user identity authentication request, the user identity authentication request including biometric feature information of the to-be-authenticated user and the to-be-authenticated identity information.

In some embodiments, the first blockchain node may receive a user identity authentication request sent by a service provider server. The user identity authentication request may include the biometric feature information of the to-be-authenticated user and the to-be-authenticated identity information. The biometric feature information may include fingerprint information, pupil information, facial images, etc., and the identity information may include a name, an age, a gender, etc.

For example, the service provider server is a server corresponding to a shopping application. The server receives a payment request sent by a user device, obtains the biometric feature information of the user from the user device according to the payment request, and uses the obtained biometric feature information as biometric feature information of a to-be-authenticated user. The server further obtains identity information for a current login of the user as to-be-authenticated identity information. The server generates a user identity authentication request according to the biometric feature information of the to-be-authenticated user and the to-be-authenticated identity information, and sends the user identity authentication request to the first blockchain node, thereby verifying, through the first blockchain node, whether the to-be-authenticated user is the user corresponding to the to-be-authenticated identity information.

As another example, a user performs a shopping payment operation through a webpage of a shopping site on a computer. Before payment, the webpage generates a QR code for identity authentication and displays the QR code. After the user scans the QR code through the corresponding shopping application in a mobile phone, the shopping application may obtain biometric feature information of the user and to-be-authenticated identity information, generate a user identity authentication request according to the biometric feature information of the user and the to-be-authenticated identity information, and send the user identity authentication request to a business (e.g., a service provider, a goods provider) server corresponding to the shopping application, to perform identity authentication on the user.

In another scenario, a user performs a shopping payment operation through a shopping application in a mobile phone. Before payment, the shopping application may obtain biometric feature information of the user and to-be-authenticated identity information, generate a user identity authentication request according to the biometric feature information of the user and the to-be-authenticated identity information, and send the user identity authentication request to a business server corresponding to the shopping application, to perform identity authentication on the user.

In still another scenario, a user performs a shopping payment operation through a mini program in the mobile phone. Before payment, the mobile phone jumps to a designated application, and the designated application may obtain biometric feature information of the user and to-be-authenticated identity information, generate a user identity authentication request according to the biometric feature information of the user and the to-be-authenticated identity information, and send the user identity authentication request to a corresponding business, to perform identity authentication on the user.

In the foregoing step S204, the first blockchain node calls a pre-deployed first smart contract according to the user identity authentication request, and performs identity authentication on the to-be-authenticated user through the first smart contract to obtain authentication result information.

In some embodiments, the first smart contract is deployed in the blockchain in advance, and an authentication program for user identity authentication is written in the first smart contract. In step S204, the first blockchain node constructs a first contract call transaction according to the user identity authentication request, and the biometric feature information of the to-be-authenticated user and to-be-authenticated identity information in the user identity authentication request are used as call parameters of the first smart contract and written into the first contract call transaction. The first blockchain node calls the first smart contract through the first contract call transaction, and performs identity authentication on the to-be-authenticated user through the first smart contract to obtain authentication result information.

In some embodiments, the performing identity authentication on the to-be-authenticated user through a first smart contract to obtain authentication result information specifically includes: (a1) querying, through the first smart contract, the biometric feature information of a user corresponding to the to-be-authenticated identity information in a user identity data node in a blockchain, and determining whether the biometric feature information of the user corresponding to the to-be-authenticated identity information is consistent with biometric feature information of the to-be-authenticated user; and (a2) if the two are consistent, determining that the to-be-authenticated user is a user corresponding to the to-be-authenticated identity information, and determining that the authentication is successful; and if the two are not consistent, determining that the to-be-authenticated user is not the user corresponding to the to-be-authenticated identity information, and determining that the authentication is failed.

Figure 3:
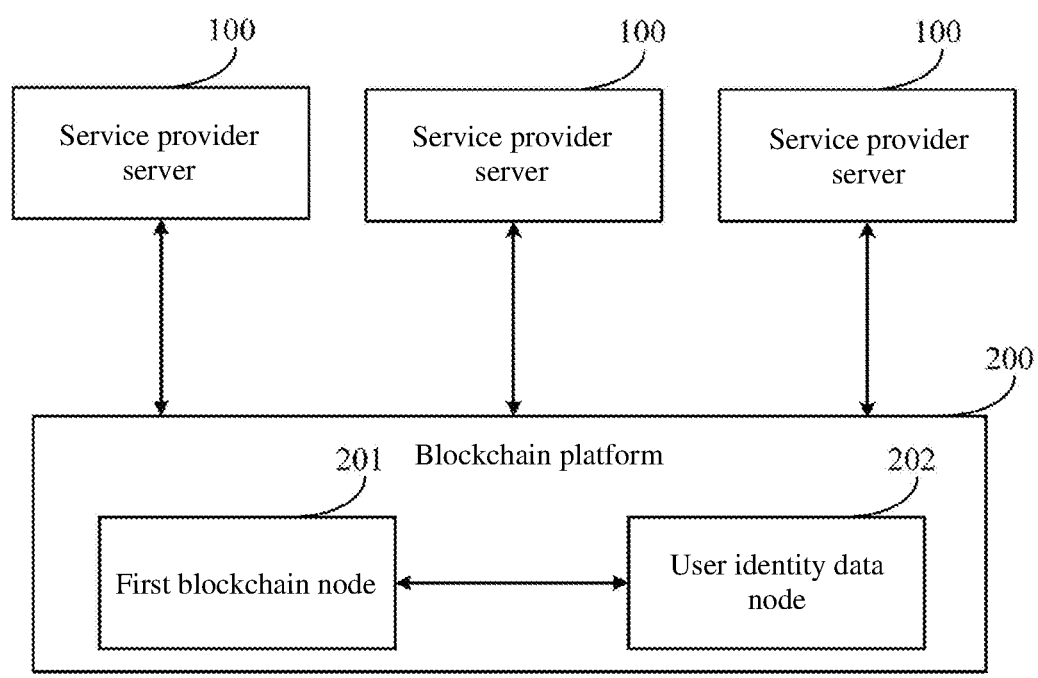
FIG. 3 is a schematic diagram of a scenario of a blockchain-based identity authentication method, according to another embodiment of the specification.

FIG. 3 is a schematic diagram of a scenario of a blockchain-based identity authentication method according to another embodiment of the specification. As shown in FIG. 3, in the scenario, a blockchain platform 200 may include a first blockchain node 201 and a user identity data node 202, where the user identity data node stores identity information of each user and biometric feature information of each user. That the biometric feature information of a user may include, as an example, a facial image. The user identity data node may store the identity information of each user and the biometric feature information of the user in the format of "name-age-gender-face image."

In the foregoing action (a1), first, the biometric feature information of the user corresponding to the to-be-authenticated identity information is queried in the user identity data node in the blockchain through the first smart contract, where the to-be-authenticated identity information may be a name, and the biometric feature information of the user corresponding to the to-be-authenticated identity information may be a facial image. Then, it is determined whether the biometric feature information of the user corresponding to the to-be-authenticated identity information is consistent with the biometric feature information of the to-be-authenticated user. For example, it is determined whether a facial image of the user corresponding to the to-be-authenticated identity information (in the user identity data node) is consistent with a facial image of the to-be-authenticated user (in the user identity authentication request).

In the foregoing action (a2), if the biometric feature information of the user corresponding to the to-be-authenticated identity information is consistent with the biometric feature information of the to-be-authenticated user, it is determined that the to-be-authenticated user is a user corresponding to the to-be-authenticated identity information, and it is determined that the authentication is successful. If the two are not consistent, it is determined that the to-be-authenticated user is not the user corresponding to the to-be-authenticated identity information, and it is determined that the authentication is failed.

In an example, the to-be-authenticated identity information may include a name "Xiao Wang," and the biometric feature information of the to-be-authenticated user may include a facial image of the to-be-authenticated user. In the foregoing actions (a1) and (a2), the facial image of "Xiao Wang" is obtained through the first smart contract, and it is determined whether the facial image of "Xiao Wang" is consistent with the facial image of the to-be-authenticated user. If the two are consistent, it is determined that "Xiao Wang" is a to-be-authenticated user, and it is determined that the authentication is successful. If the two are not consistent, it is determined that the to-be-authenticated user is not "Xiao Wang, and then it is determined that the authentication is failed.

In some embodiments, the foregoing first smart contract may be called in the trusted execution environment provided by the blockchain to perform identity authentication on the to-be-authenticated user, thereby ensuring accuracy of the authentication process.

In the foregoing step S206, the first blockchain node calls a pre-deployed second smart contract according to authentication result information, biometric feature information of the to-be-authenticated user, and the to-be-authenticated identity information, and generates a user identity authentication record through the second smart contract. The authentication result information may include an authentication success information and an authentication failure information.

In some embodiments, the second smart contract is deployed in the blockchain in advance, and a generating program for generating a user identity authentication record is written in the second smart contract. In step S206, the first blockchain node constructs a second contract call transaction according to the authentication result information, the biometric feature information of the to-be-authenticated user, and the to-be-authenticated identity information, and the authentication result information, the biometric feature information of the to-be-authenticated user, and to-be-authenticated identity information are used as call parameters of the second smart contract and written into the second contract call transaction. The first blockchain node calls the second smart contract through the second contract call transaction, and generates the user identity authentication record through the second smart contract.

In some embodiments, the generating the user identity authentication record through the second smart contract specifically includes: (a3) obtaining generation time corresponding to the authentication result information (e.g., a generation time indicating when the authentication result is generated) through the second smart contract, and combining biometric feature information of a to-be-authenticated user, to-be-authenticated identity information, authentication result information, and the generation time into the user identity authentication record.

In some embodiments, the generation time corresponding to the authentication result information is obtained through the second smart contract. Then, the biometric feature information of to-be-authenticated user, the to-be-authenticated identity information, the authentication result information, and the generation time are combined into the user identity authentication record. The format of the user identity authentication record may be "{biometric feature information of the to-be-authenticated user, to-be-authenticated identity information, authentication result information, the generation time}." For example, a user authentication record is "{a facial image of the user, Xiao Wang, authentication success information, 10:30}." The user identity authentication record may be understood as "at 10:30, Xiao Wang uses the facial image to perform identity authentication, and authentication succeeds."

In some embodiments, the foregoing second smart contract may be called in the trusted execution environment provided by the blockchain to generate a user identity authentication record, thereby ensuring accuracy of the information generating process.

In some embodiments, the user identity authentication record may be generated when the authentication is successful, and the authenticated user identity authentication record is uploaded to a blockchain for storage.

In the foregoing step S208, the first blockchain node stores the user identity authentication record into the blockchain for attestation, thereby storing information related to the identity authentication process into the blockchain in the form of user identity authentication record for attestation. This way, authenticity and validity of the stored information can be ensured by utilizing the tamper resistance feature of the blockchain.

Figure 4:
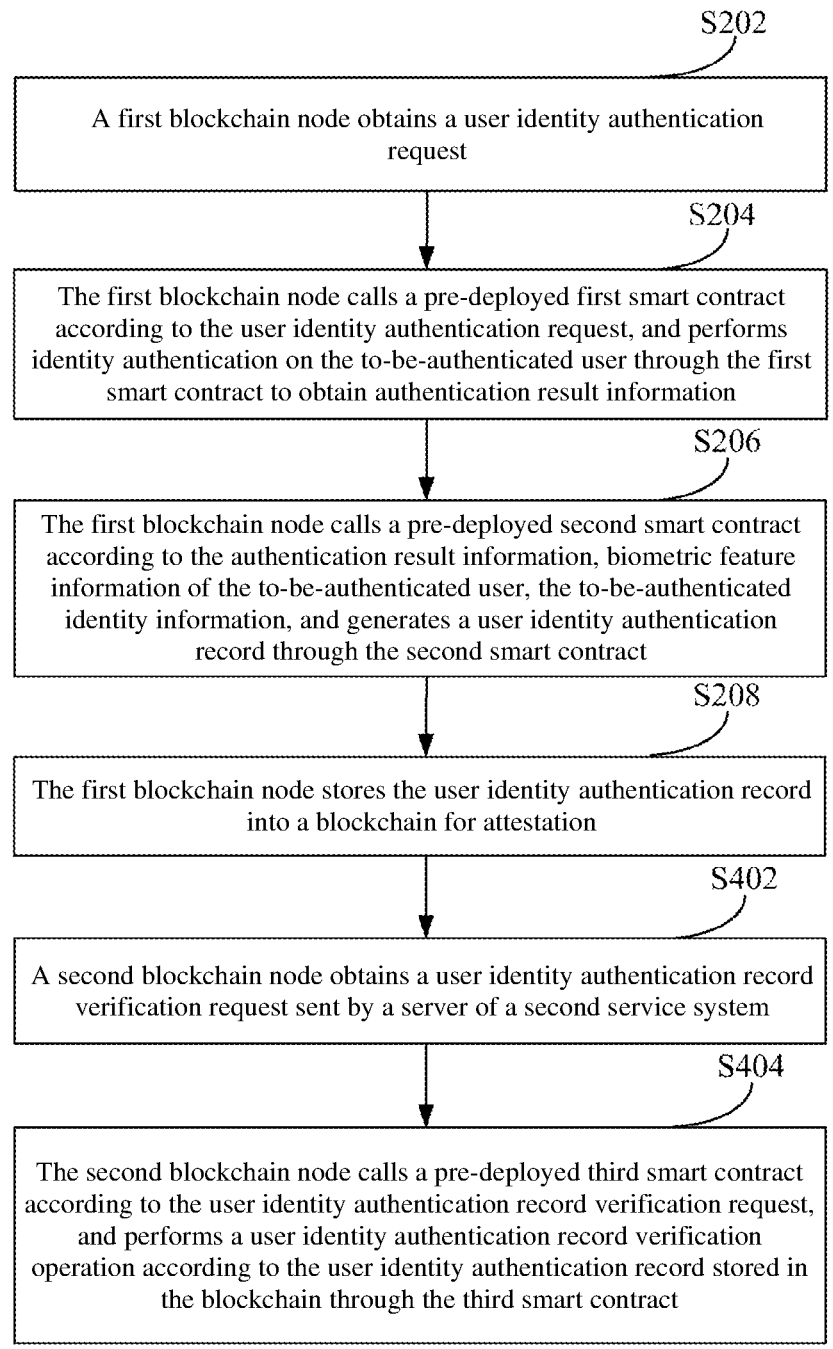
FIG. 4 is a schematic diagram showing a process of a blockchain-based identity authentication method, according to another embodiment of the specification.

In some embodiments, the user identity authentication request may be sent by a server of a first business system to the first blockchain node. Correspondingly, FIG. 4 is a schematic diagram showing a process of a blockchain-based identity authentication method, according to another embodiment of the specification. As shown in FIG. 4, in comparison to FIG. 2, the process further may include the following steps.

In step S402, obtaining, by a second blockchain node, a user identity authentication record verification request sent by a server of a second business system, the user identity authentication record verification request including authenticated identity information and biometric feature information used for authentication that are notified by the server of the first business system to the server of the second business system.

In step S404, calling, by the second blockchain node, a pre-deployed third smart contract according to the user identity authentication record verification request, and performing, through the third smart contract, a user identity authentication record verification operation according to the user identity authentication record stored in the blockchain.

In some embodiments, the first smart contract, the second smart contract, and the third smart contract are different from a logical point of view (e.g., they serve different functionalities), and may be combined into one or two smart contracts depending on the implementation (e.g., all three of them are written as three different function calls of a same smart contract).

In some embodiments, the server of the first business system sends the user identity authentication request to the first blockchain node, and the first blockchain node further returns the authentication result information to the server of the first business system, so that the server of the first business system learns the authenticated identity information and the biometric feature information used for authentication. The authenticated identity information is to-be-authenticated identity information carried in the authenticated user identity authentication request, and the biometric feature information used for authentication is the biometric feature information of the to-be-authenticated user that is carried in the authenticated user identity authentication request. The server of the first business system further notifies the server of the second business system of the authenticated identity information and the biometric feature information used for authentication.

In order to verify the authenticity of the authenticated identity information and the biometric feature information used for authentication that are sent by the server of the first business system, the server of the second business system generates a user identity authentication record verification request according to the authenticated identity information and the biometric feature information used for authentication that are sent by the server of the first business system, and sends the user identity authentication record verification request to a second blockchain node of the blockchain. The second blockchain node and the foregoing first blockchain node may be a same node, or may be different nodes, which is not limited herein.

The second blockchain node obtains a user identity authentication record verification request sent by the server of the second business system, calls a pre-deployed third smart contract according to the user identity authentication record verification request, and performs, through the third smart contract, a user identity authentication record verification operation according to the user identity authentication record stored in the blockchain.

In some embodiments, the third smart contract is deployed in the blockchain in advance, and a program for performing a user identity authentication record verification operation is written in the third smart contract.

In step S404, the second blockchain node constructs a third contract call transaction according to the user identity authentication record verification request, and the authenticated identity information and the biometric feature information used for authentication in the user identity authentication record verification request are used as call parameters of the third smart contract and written into the third contract call transaction. The second blockchain node calls the third smart contract through the third contract call transaction, and performs a user identity authentication record verification operation according to the user identity authentication record stored in the blockchain through the third smart contract.

In some embodiments, the performing, through the third smart contract, a user identity authentication record verification operation according to the user identity authentication record stored in the blockchain specifically includes: (b1) looking up, through the third smart contract, biometric feature information and an authentication result corresponding to the authenticated identity information in the identity authentication records stored in the blockchain, determining whether the found biometric feature information is the biometric feature information used for the authentication, and determining whether the found authentication result is successful authentication; and (b2) if the found biometric feature information is the biometric feature information used for the authentication, and the found authentication result is successful authentication, determining, by the second blockchain node, that the user identity authentication record verification succeeds, otherwise determining, by the second blockchain node, that the user identity authentication record verification fails.

Specifically, the third smart contract is used to look up the biometric feature information and the authentication result corresponding to the foregoing authenticated identity information in each user identity authentication record. If the found biometric feature information is the biometric feature information used for the foregoing authentication, and if the found authentication result is successful authentication, it indicates that the authenticated information and the biometric feature information used for authentication that are notified by the server of the first business system to the server of the second business system are authentic. Therefore, it is determined that the user identity authentication record verification succeeds. On the contrary, if the found biometric feature information is not the biometric feature information used for authentication, or the found authentication result is not successful authentication, it indicates that the authenticated identity information and the biometric feature information used for authentication that are notified by the server of the first business system to the server of the second business system are forged. Therefore, it is determined that the user identity authentication record verification fails.

In a specific example, the first business system corresponds to a login service by which a user logs in to mobile banking, and the second business system corresponds to a loan application service in which a user applies for a loan in the mobile banking. The server of the first business system performs identity authentication on the user through the first blockchain node in the blockchain, and obtains authentication result information. The server of the first business system sends the authenticated identity information and the biometric feature information used for authentication to the server of the second business system according to the authentication result information. The server of the second business system generates a user identity authentication record verification request, and sends the user identity authentication record verification request to a second blockchain node in the blockchain according to the authenticated identity information and the biometric feature information used for authentication, so that authenticity of the authenticated identity information and the biometric feature information used for authentication is verified according to the user identity authentication record stored in the blockchain. After determining the authenticity of the authenticated identity information and the biometric feature information used for authentication, and determining that the user identity authentication record verification succeeds, the second business system then performs a corresponding service operation, thereby preventing the first business system from forging the user identity authentication result, to ensure security of service operations and ensure property security of the user.

In some embodiments, the foregoing third smart contract may be called in the trusted execution environment provided by the blockchain to perform the user identity authentication record verification operation, thereby using the trusted execution environment to ensure accuracy of the verification process. It may be learned that, according to the embodiment of the specification, the user identity authentication record is stored in the blockchain, so that an effect of verifying the user identity authentication record can further be achieved, preventing a service provider from forging the user identity authentication result.

Figure 5:
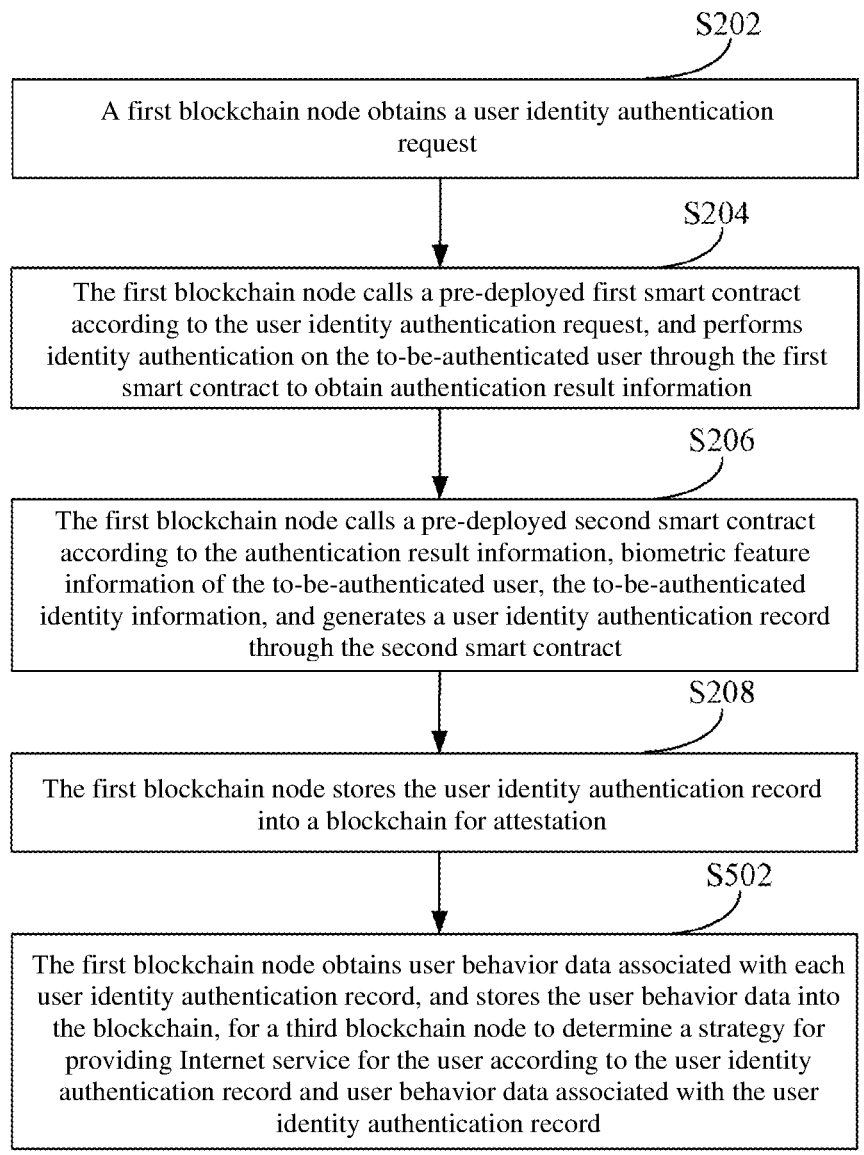
FIG. 5 is a schematic diagram showing a process of a blockchain-based identity authentication method, according to another embodiment of the specification.

FIG. 5 is a schematic diagram showing a process of a blockchain-based identity authentication method, according to another embodiment of the specification. As shown in FIG. 5, in comparison to FIG. 2, the process further may include the following steps.

In step S502, obtaining, by a blockchain node, user behavior data associated with each user identity authentication record, and storing the user behavior data into a blockchain, and determining, by a third blockchain node, an Internet service recommendation strategy for a user (e.g., a strategy for providing Internet service for the target user) according to the user identity authentication record and user behavior data associated with the user identity authentication record.

The first blockchain node may obtain user behavior data associated with each user identity authentication record, and the user behavior data associated with each user identity authentication record may be behavior data on which user identity authentication needs to be performed and that is performed by the user, such as payment behavior data and transfer behavior data. The first blockchain node stores the obtained user behavior data into a blockchain, and the third blockchain node determines the Internet service recommendation strategy of the user according to the user identity authentication record and the user behavior data associated with the user identity authentication record.

The third blockchain node may determine, according to the stored user identity authentication record and the user behavior data associated with the user identity authentication record, user behavior data performed by the user when the identity authentication succeeds. For example, the third blockchain node may determine behavior performed by the user using his/her real identity, thereby determining an Internet service recommendation strategy of the user according to the behavior performed by the user using his/her real identity. For example, if it is determined that the behavior performed by a user using his/her real identity may include purchasing a large number of diapers and baby formula, it is determined that the user is concerned about maternal and child supplies, and accordingly, the Internet service recommendation strategy of the user may include recommending maternal information.

Correspondingly, the determining, by a third blockchain node, an Internet service recommendation strategy of a user according to the user identity authentication record and user behavior data associated with the user identity authentication record specifically includes: (c1) obtaining, by the third blockchain node, identity information of a target user for providing a to-be-determined Internet service; (c2) looking up, by the third blockchain node, in each user identity authentication record stored in the blockchain and the associated user behavior data, a target identity authentication record corresponding to the identity information of the target user and the associated user behavior data; (c3) obtaining, by the third blockchain node, corresponding authentication result information from the found associated user behavior data, and using the corresponding authentication result information as target behavior data of authentication success information, where the authentication result information may include authentication success information or authentication failure information; and (c4) calling, by the third blockchain node, a pre-deployed fourth smart contract according to the target behavior data, and determining an Internet service recommendation strategy of the target user through the fourth smart contract.

In some embodiments, the first smart contract, the second smart contract, the third smart contract, and the fourth smart contract are different from a logical point of view (e.g., they serve different functionalities), and may be combined into a less number of smart contracts depending on the implementation (e.g., all four of them are written as different function calls of a same smart contract).

In the foregoing action (c1), the third blockchain node obtains identity information of the target user for providing a to-be-determined Internet service. For example, the third blockchain node obtains a name "Xiao Wang" of the target user.

In the foregoing action (c2), the third blockchain node looks up, in each user identity authentication record stored in the blockchain and the associated user behavior data, the target identity authentication record corresponding to the identity information of the target user and the user behavior data associated with the target identity authentication record. For example, the third blockchain node looks up a target identity authentication record corresponding to "Xiao Wang" and user behavior data associated with the target identity authentication record.

In the foregoing action (c3), the third blockchain node obtains the corresponding authentication result information from the found associated user behavior data, and uses the corresponding authentication result information as target behavior data of authentication success information. For example, the user behavior data corresponding to the authentication success information is obtained from the found associated user behavior data corresponding to "Xiao Wang," and the user behavior data corresponding to the authentication success information is used as the target behavior data. The target behavior data is behavior data performed by the target user using his or her real identity.

In the foregoing action (c4), the third blockchain node calls a pre-deployed fourth smart contract according to the target behavior data, and determines an Internet service recommendation strategy of the target user through the fourth smart contract. The fourth smart contract records a program for determining the Internet service recommendation strategy. The fourth smart contract may determine an Internet service recommendation strategy of the target user according to the target behavior data. For example, the target behavior data may include behavior data of purchasing a large quantity of cosmetics, it indicates that the behavior performed by the target user using his or her real identity may include purchasing a large quantity of cosmetics. Accordingly, the Internet service recommendation strategy for the user may include recommending information about cosmetics.

In some embodiments, the third blockchain node, the second blockchain node, and the first blockchain node may be a same node, or may be different nodes. The target behavior data is the behavior data performed by the target user using his or her real identity. According to the behavior data performed by the target user using his or her real identity, the Internet service recommendation strategy of the target user may be determined.

It may be learned that, by storing the user identity authentication record and the user behavior data in the blockchain, the Internet service recommendation strategy may be accurately determined.

Based on the above, according to the embodiment of the specification, identity authentication nay be performed on the user through smart contracts in the blockchain, and the user identity authentication record may be stored in the blockchain, thereby storing information related to the identity authentication process into the blockchain in the form of user identity authentication record for attestation, so that authenticity and validity of the stored information can be ensured by utilizing the tamper resistance feature of the blockchain.

Figure 6:
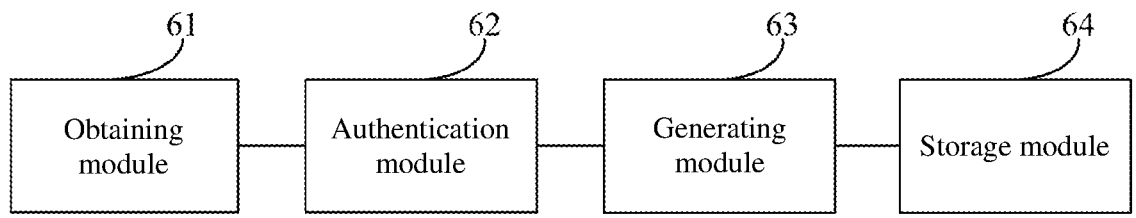
FIG. 6 is a schematic diagram of constituent modules of a blockchain-based identity authentication apparatus, according to an embodiment of the specification.

FIG. 6 is a schematic diagram of constituent modules of a blockchain-based identity authentication apparatus, according to an embodiment of the specification. As shown in FIG. 6, the apparatus includes: an obtaining module 61 configured to obtain a user identity authentication request, the user identity authentication request including biometric feature information of a to-be-authenticated user and to-be-authenticated identity information; an authentication module 62 configured to call a pre-deployed first smart contract according to the user identity authentication request, and perform identity authentication on the to-be-authenticated user through the first smart contract to obtain authentication result information; a generating module 63 configured to call a pre-deployed second smart contract according to the authentication result information, the biometric feature information of the to-be-authenticated user, and the to-be-authenticated identity information, and generate a user identity authentication record through the second smart contract; and a storage module 64 configured to store the user identity authentication record into a blockchain for attestation.

In some embodiments, the authentication module 62 is specifically configured to: query, through the first smart contract, the biometric feature information of a user corresponding to the to-be-authenticated identity information in a user identity data node in the blockchain, and determine whether the biometric feature information of the user corresponding to the to-be-authenticated identity information is consistent with the biometric feature information of the to-be-authenticated user; and if the two are consistent, determine that the to-be-authenticated user is a user corresponding to the to-be-authenticated identity information, and determine that the authentication is successful; and if the two are not consistent, determine that the to-be-authenticated user is not the user corresponding to the to-be-authenticated identity information, and determine that the authentication is failed.

In some embodiments, the generating module 63 is specifically configured to: obtain generation time corresponding to the authentication result information through the second smart contract, and combine the biometric feature information of the to-be-authenticated user, the to-be-authenticated identity information, the authentication result information, and the generation time into the user identity authentication record.

In some embodiments, the user identity authentication request is sent by a server of a first business system to the blockchain. The apparatus further may include a verification module configured to: obtain a user identity authentication record verification request sent by a server of a second business system, the user identity authentication record verification request including authenticated identity information and biometric feature information used for authentication that are notified by the server of the first business system to the server of the second business system; and call a pre-deployed third smart contract according to the user identity authentication record verification request, and perform, through the third smart contract, a user identity authentication record verification operation according to the user identity authentication record stored in the blockchain.

In some embodiments, the verification module is specifically configured to: look up, through the third smart contract, biometric feature information and an authentication result corresponding to the authenticated identity information in each user identity authentication record stored in the blockchain, determine whether the found biometric feature information is the biometric feature information used for the authentication, and determine whether the found authentication result is successful authentication; and if the found biometric feature information is the biometric feature information used for the authentication, and the found authentication result is successful authentication, determine that the user identity authentication record verification succeeds, otherwise determine that the user identity authentication record verification fails.

In some embodiments, the apparatus further may include a provision module configured to: obtain user behavior data associated with each user identity authentication record, and store the user behavior data into the blockchain to determine an Internet service recommendation strategy of a user according to the user identity authentication record and user behavior data associated with the user identity authentication record.

In some embodiments, the provision module is specifically configured to: obtain identity information of a target user of a to-be-determined Internet service; look up, in each user identity authentication record stored in the blockchain and user behavior data associated with each user identity authentication record stored in the blockchain, a target identity authentication record corresponding to the identity information of the target user and user behavior data associated with the target identity authentication record; obtain corresponding authentication result information from the found associated user behavior data, and use the corresponding authentication result information as target behavior data of authentication success information, where the authentication result information may include authentication success information or authentication failure information; and call a pre-deployed fourth smart contract according to the target behavior data, and determine an Internet service recommendation strategy of the target user through the fourth smart contract.

In the embodiment of the specification, the first blockchain node first obtains a user identity authentication request, then calls a pre-deployed first smart contract according to the user identity authentication request, performs identity authentication on the to-be-authenticated user through the first smart contract to obtain the authentication result information, then calls the pre-deployed second smart contract according to the authentication result information, the biometric feature information of the to-be-authenticated user, and the to-be-authenticated identity information, generates the user identity authentication record through the second smart contract, and finally stores the user identity authentication record into the blockchain for attestation. It may be learned that, according to the embodiment of the specification, the identity authentication can be performed on the user through smart contracts in the blockchain, and the user identity authentication record is stored in the blockchain, thereby storing related information in the identity authentication process into the blockchain in the form of user identity authentication record for attestation, so that authenticity and validity of the stored information can be ensured by utilizing the tamper resistance feature of the blockchain.

The blockchain-based identity authentication apparatus in the embodiment of the specification can implement each process of the foregoing blockchain-based identity authentication method, and achieve a same effect and function, and details are not described herein again.

Further, an embodiment of the specification further provides a blockchain-based identity authentication device.

Figure 7:
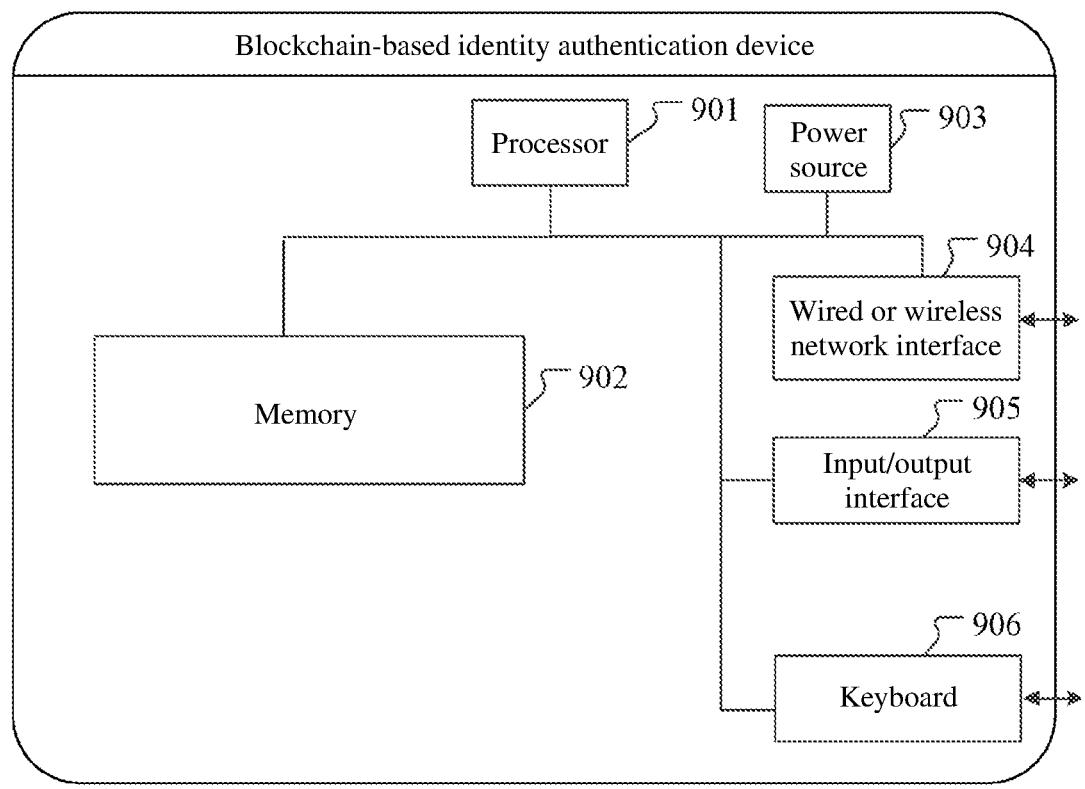
FIG. 7 is a schematic structural diagram of a blockchain-based identity authentication device, according to an embodiment of the specification.

FIG. 7 is a schematic structural diagram of a blockchain-based identity authentication device, according to an embodiment of the specification. As shown in FIG. 7, the blockchain-based identity authentication device may have relatively large differences due to different configurations or performance, which may include one or more processors 901 and a memory 902. The memory 902 may store one or more storage applications or data. The memory 902 may provide transitory storage or persistent storage. An application stored in the memory 902 may include one or more modules (not shown in the figure), each module including a series of computer-executable instructions in a blockchain-based identity authentication device. Further, the processor 901 may be configured to communicate with the memory 902 to execute the series of computer-executable instructions in the memory 902 on the blockchain-based identity authentication device. The blockchain-based identity authentication device may further include one or more power sources 903, one or more wired or wireless network interfaces 904, one or more input/output interfaces 905, one or more keyboards 906, and the like.

In a specific embodiment, the blockchain-based identity authentication device may include a memory and one or more programs. One or more programs are stored in the memory, the one or more programs including one or one modules, and each module may include a series of computer-executable instructions in the blockchain-based identity authentication device. The one or more programs, which are configured for execution by one or more processors, include the following computer-executable instructions for: obtaining, by a first blockchain node, a user identity authentication request, the user identity authentication request including biometric feature information of a to-be-authenticated user and to-be-authenticated identity information; calling, by the first blockchain node, a pre-deployed first smart contract according to the user identity authentication request, and performing identity authentication on the to-be-authenticated user through the first smart contract to obtain authentication result information; calling, by the first blockchain node, a pre-deployed second smart contract according to the authentication result information, the biometric feature information of the to-be-authenticated user, and the to-be-authenticated identity information, and generating a user identity authentication record through the second smart contract; and storing, by the first blockchain node, the user identity authentication record into a blockchain for attestation.

In some embodiments, when the computer-executable instructions are executed, the performing identity authentication on the to-be-authenticated user through the first smart contract to obtain authentication result information includes: querying, through the first smart contract, the biometric feature information of a user corresponding to the to-be-authenticated identity information in a user identity data node in the blockchain, and determining whether the biometric feature information of the user corresponding to the to-be-authenticated identity information is consistent with the biometric feature information of the to-be-authenticated user; and if the two are consistent, determining that the to-be-authenticated user is a user corresponding to the to-be-authenticated identity information, and determining that the authentication is successful; and if the two are not consistent, determining that the to-be-authenticated user is not the user corresponding to the to-be-authenticated identity information, and determining that the authentication is failed.

In some embodiments, when the computer-executable instructions are executed, the generating a user identity authentication record through the second smart contract includes: obtaining generation time corresponding to the authentication result information through the second smart contract, and combining the biometric feature information of the to-be-authenticated user, the to-be-authenticated identity information, the authentication result information, and the generation time into the user identity authentication record.

In some embodiments, when the computer-executable instructions are executed, the user identity authentication request is sent by a server of a first business system to the first blockchain node. The method further includes: obtaining, by a second blockchain node, a user identity authentication record verification request sent by a server of a second business system, the user identity authentication record verification request including authenticated identity information and biometric feature information used for authentication that are notified by the server of the first business system to the server of the second business system; and calling, by the second blockchain node, a pre-deployed third smart contract according to the user identity authentication record verification request, and performing, through the third smart contract, a user identity authentication record verification operation according to the user identity authentication record stored in the blockchain.

In some embodiments, when the computer-executable instructions are executed, the performing, through the third smart contract, a user identity authentication record verification operation according to the user identity authentication record stored in the blockchain includes: looking up, through the third smart contract, biometric feature information and an authentication result corresponding to the authenticated identity information in each user identity authentication record stored in the blockchain, determining whether the found biometric feature information is the biometric feature information used for the authentication, and determining whether the found authentication result is successful authentication; and if the found biometric feature information is the biometric feature information used for the authentication, and the found authentication result is successful authentication, determining, by the second blockchain node, that the user identity authentication record verification succeeds, otherwise determining, by the second blockchain node, that the user identity authentication record verification fails.

In some embodiments, when the computer-executable instructions are executed, the method further includes: obtaining, by the first blockchain node, user behavior data associated with each user identity authentication record, and storing the user behavior data into the blockchain, and determining, by a third blockchain node, an Internet service recommendation strategy of a user according to the user identity authentication record and user behavior data associated with the user identity authentication record.

In some embodiments, when the computer-executable instructions are executed, the determining, by a third blockchain node, an Internet service recommendation strategy of a user according to the user identity authentication record and user behavior data associated with the user identity authentication record includes: obtaining, by the third blockchain node, identity information of a target user of a to-be-determined Internet service; looking up, by the third blockchain node, in each user identity authentication record stored in the blockchain and user behavior data associated with each user identity authentication record stored in the blockchain, a target identity authentication record corresponding to the identity information of the target user and user behavior data associated with the target identity authentication record; obtaining, by the third blockchain node, corresponding authentication result information from the found associated user behavior data, and using the corresponding authentication result information as target behavior data of authentication success information, where the authentication result information may include authentication success information or authentication failure information; calling, by the third blockchain node, a pre-deployed fourth smart contract according to the target behavior data, and determining an Internet service recommendation strategy of the target user through the fourth smart contract.

In the embodiment of the specification, the first blockchain node first obtains a user identity authentication request, then calls a pre-deployed first smart contract according to the user identity authentication request, performs identity authentication on the to-be-authenticated user through the first smart contract to obtain the authentication result information, then calls the pre-deployed second smart contract according to the authentication result information, the biometric feature information of the to-be-authenticated user, and the to-be-authenticated identity information, generates the user identity authentication record through the second smart contract, and finally stores the user identity authentication record into the blockchain for attestation. According to the embodiment of the specification, the identity authentication can be performed on the user through smart contracts in the blockchain, and the user identity authentication record is stored in the blockchain, thereby storing related information in the identity authentication process into the blockchain in the form of user identity authentication record for attestation, so that authenticity and validity of the stored information can be ensured by utilizing the tamper resistance feature of the blockchain.

The blockchain-based identity authentication device in the embodiment of the specification can implement each process of the foregoing blockchain-based identity authentication method, and achieve a same effect and function, and details are not described herein again.

Further, an embodiment of the present specification further provides a storage medium for storing computer-executable instructions. In a specific embodiment, the storage medium may be a U disk, an optical disk, a hard disk, etc. When the computer-executable instructions stored in the storage medium are executed by a processor, the following processes can be implemented: obtaining, by a first blockchain node, a user identity authentication request, the user identity authentication request including biometric feature information of a to-be-authenticated user and to-be-authenticated identity information; calling, by the first blockchain node, a pre-deployed first smart contract according to the user identity authentication request, and performing identity authentication on the to-be-authenticated user through the first smart contract to obtain authentication result information; calling, by the first blockchain node, a pre-deployed second smart contract according to the authentication result information, the biometric feature information of the to-be-authenticated user, and the to-be-authenticated identity information, and generating a user identity authentication record through the second smart contract; and storing, by the first blockchain node, the user identity authentication record into a blockchain for attestation.

In some embodiments, when the computer-executable instructions stored in the storage medium are executed by a processor, the performing identity authentication on the to-be-authenticated user through the first smart contract to obtain authentication result information includes: querying, through the first smart contract, the biometric feature information of a user corresponding to the to-be-authenticated identity information in a user identity data node in the blockchain, and determining whether the biometric feature information of the user corresponding to the to-be-authenticated identity information is consistent with the biometric feature information of the to-be-authenticated user; and if the two are consistent, determining that the to-be-authenticated user is a user corresponding to the to-be-authenticated identity information, and determining that the authentication is successful; and if the two are not consistent, determining that the to-be-authenticated user is not the user corresponding to the to-be-authenticated identity information, and determining that the authentication is failed.

In some embodiments, when the computer-executable instructions stored in the storage medium are a processor, the generating a user identity authentication record through the second smart contract includes: obtaining generation time corresponding to the authentication result information through the second smart contract, and combining the biometric feature information of the to-be-authenticated user, the to-be-authenticated identity information, the authentication result information, and the generation time into the user identity authentication record.

In some embodiments, when the computer-executable instructions stored in the storage medium are executed by a processor, the user identity authentication request is sent by a server of a first business system to the first blockchain node. The method further includes: obtaining, by a second blockchain node, a user identity authentication record verification request sent by a server of a second business system, the user identity authentication record verification request including authenticated identity information and biometric feature information used for authentication that are notified by the server of the first business system to the server of the second business system; and calling, by the second blockchain node, a pre-deployed third smart contract according to the user identity authentication record verification request, and performing, through the third smart contract, a user identity authentication record verification operation according to the user identity authentication record stored in the blockchain.

In some embodiments, when the computer-executable instructions stored in the storage medium are executed by a processor, the performing, through the third smart contract, a user identity authentication record verification operation according to the user identity authentication record stored in the blockchain includes: looking up, through the third smart contract, biometric feature information and an authentication result corresponding to the authenticated identity information in each user identity authentication record stored in the blockchain, determining whether the found biometric feature information is the biometric feature information used for the authentication, and determining whether the found authentication result is successful authentication; and if the found biometric feature information is the biometric feature information used for the authentication, and the found authentication result is successful authentication, determining, by the second blockchain node, that the user identity authentication record verification succeeds, otherwise determining, by the second blockchain node, that the user identity authentication record verification fails.

In some embodiments, when the computer-executable instructions stored in the storage medium are executed by the processor, the method further includes: obtaining, by the first blockchain node, user behavior data associated with each user identity authentication record, and storing the user behavior data into the blockchain, and determining, by a third blockchain node, an Internet service recommendation strategy of a user according to the user identity authentication record and user behavior data associated with the user identity authentication record.

In some embodiments, when the computer-executable instructions stored in the storage medium are executed by a processor, the determining, by a third blockchain node, an Internet service recommendation strategy of a user according to the user identity authentication record and user behavior data associated with the user identity authentication record includes: obtaining, by the third blockchain node, identity information of a target user of a to-be-determined Internet service; looking up, by the third blockchain node, in each user identity authentication record stored in the blockchain and user behavior data associated with each user identity authentication record stored in the blockchain, a target identity authentication record corresponding to the identity information of the target user and user behavior data associated with the target identity authentication record; obtaining, by the third blockchain node, corresponding authentication result information from the found associated user behavior data, and using the corresponding authentication result information as target behavior data of authentication success information, where the authentication result information may include authentication success information or authentication failure information; calling, by the third blockchain node, a pre-deployed fourth smart contract according to the target behavior data, and determining an Internet service recommendation strategy of the target user through the fourth smart contract.

In the embodiments of the specification, the first blockchain node first obtains a user identity authentication request, then calls a pre-deployed first smart contract according to the user identity authentication request, performs identity authentication on the to-be-authenticated user through the first smart contract to obtain the authentication result information, then calls the pre-deployed second smart contract according to the authentication result information, the biometric feature information of the to-be-authenticated user, and the to-be-authenticated identity information, generates the user identity authentication record through the second smart contract, and finally stores the user identity authentication record into the blockchain for attestation. It may be learned that, according to the embodiment of the specification, the identity authentication can be performed on the user through smart contracts in the blockchain, and the user identity authentication record is stored in the blockchain, thereby storing related information in the identity authentication process into the blockchain in the form of user identity authentication record for attestation, so that authenticity and validity of the stored information can be ensured by utilizing the tamper resistance feature of the blockchain.

The storage medium in the embodiment of the specification can implement each process of the foregoing blockchain-based identity authentication method, and achieve a same effect and function, and details are not described herein again.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of this application, the function of the units may be implemented in a same piece of or multiple pieces of software and/or hardware.

A person skilled in the art should understand that the embodiments of this application may be provided as a method, a system, or a computer program product. Therefore, this application may use a form of a hardware-only embodiment, a software-only embodiment, or an embodiment combining software and hardware. In addition, this application may use a form of a computer program product implemented on one or more computer available storage media (including but not limited to a disk memory, a CD-ROM, an optical memory, and the like) including computer available program code.

This application is described with reference to flowcharts and/or block diagrams of the method, the device (system), and the computer program product in the embodiments of this application. The computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device may include one or more processors (CPUs), an input/output interface, a network interface, and a memory.

The memory may include, among computer readable media, a non-persistent memory such as a random-access memory (RAM) and/or a non-volatile memory such as a read-only memory (ROM) or a flash memory (flash RAM). The memory is an example of the computer readable medium.

The computer readable medium may include a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. It should also be noted that the terms "include." "comprise" and any other variants thereof mean to cover the non-exclusive inclusion.

The terms "include." "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

The embodiments of this application may be provided as a method, a system, or a computer program product. Therefore, this application may use a form of hardware only embodiments, software only embodiments, or embodiments with a combination of software and hardware. In addition, this application may use a form of a computer program product implemented on one or more computer available storage media (including but not limited to a disk memory, a CD-ROM, an optical memory, and the like) including computer available program code.

This application can be described in the general context of computer executable instructions executed by a computer, for example, a program module. Generally, the program module may include a routine, a program, an object, a component, a data structure, and the like for executing a particular task or implementing a particular abstract data type. This application can also be practiced in a distributed computing environment in which tasks are performed by remote processing devices that are connected through a communication network. In a distributed computing environment, the program module may be located in both local and remote computer storage media including storage devices.

The embodiments in this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of this application and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A blockchain-based identity authentication method, comprising:

obtaining a user identity authentication request, the user identity authentication request comprising first to-be-authenticated biometric feature information of a user and to-be-authenticated identity information of the user, wherein the user identity authentication request is received from a server of a first service provider system;

querying, through a first smart contract in a blockchain, biometric feature information based on the to-be-authenticated identity information in a user identity data node in the blockchain;

obtaining, through the first smart contract, an authentication result by determining whether the biometric feature information is consistent with the first to-be-authenticated biometric feature information;

if the biometric feature information is consistent with the first to-be-authenticated biometric feature information, generating, through a second smart contract, a user identity authentication record comprising the first to-be-authenticated biometric feature information, the to-be-authenticated identity information, and the authentication result;

storing the user identity authentication record into the blockchain;

obtaining a user identity authentication record verification request from a server of a second service provider system, the user identity authentication record verification request comprising second to-be-authenticated identity information of the user and second to-be-authenticated biometric feature information of the user, wherein the second to-be-authenticated identity information of the user and the second to-be-authenticated biometric feature information of the user are sent from the server of the first service provider system to the server of the second service provider system;

searching, through a third smart contract, for a record from a plurality of the user identity authentication records stored in the blockchain based on the second to-be-authenticated identity information, wherein the record comprises second biometric feature information;

determining, through the third smart contract, whether the second biometric feature information in the record is consistent with the second to-be-authenticated biometric feature information, and whether the authentication result is positive; and if both determinations are positive, returning authentication success information to the user identity authentication record verification request, otherwise returning authentication failure information to the user identity authentication record verification request.

2. The method according to claim 1, wherein the first smart contract and the second smart contract are the same smart contract.

3. The method according to claim 1, further comprising:
obtaining, through the second smart contract, a generation time indicating when the authentication result is generated, wherein the user identity authentication record further comprises the generation time.

4. The method of claim 1, wherein the third smart contract and at least one of the first smart contract and the second smart contract are the same smart contract.

5. The method according to claim 1, wherein the user identity authentication record further comprises user behavior data.

6. The method according to claim 5, further comprising:
obtaining identity information of a target user;

searching, from a plurality of the user identity authentication records stored in the blockchain based on the identity information of the target user, for one or more records that have positive authentication results;

obtaining user behavior data associated with the one or more records; and calling a fourth smart contract for the fourth smart contract to determine a strategy for providing Internet service for the target user according to the user behavior data.

7. The method according to claim 6, wherein the fourth smart contract and at least one of the first smart contract and the second smart contract are the same smart contract.

8. A system for blockchain-based identity authentication, comprising one or more processors and one or more non-transitory computer-readable memories coupled to the one or more processors and configured with instructions executable by the one or more processors to cause the system to perform operations comprising:

obtaining a user identity authentication request, the user identity authentication request comprising first to-be-authenticated biometric feature information of a user and to-be-authenticated identity information of the user, wherein the user identity authentication request is received from a server of a first service provider system;

querying, through a first smart contract in a blockchain, biometric feature information based on the to-be-authenticated identity information in a user identity data node in the blockchain;

obtaining, through the first smart contract, an authentication result by determining whether the biometric feature information is consistent with the first to-be-authenticated biometric feature information;

if the biometric feature information is consistent with the first to-be-authenticated biometric feature information, generating, through a second smart contract, a user identity authentication record comprising the first to-be-authenticated biometric feature information, the to-be-authenticated identity information, and the authentication result;

storing the user identity authentication record into the blockchain;

obtaining a user identity authentication record verification request from a server of a second service provider system, the user identity authentication record verification request comprising second to-be-authenticated identity information of the user and second to-be-authenticated biometric feature information of the user, wherein the second to-be-authenticated identity information of the user and the second to-be-authenticated biometric feature information of the user are sent from the server of the first service provider system to the server of the second service provider system;

searching, through a third smart contract, for a record from a plurality of the user identity authentication records stored in the blockchain based on the second to-be-authenticated identity information, wherein the record comprises a second biometric feature information;

determining, through the third smart contract, whether the second biometric feature information in the record is consistent with the second to-be-authenticated biometric feature information, and whether the authentication result is positive; and if both determinations are positive, returning authentication success information to the user identity authentication record verification request, otherwise returning authentication failure information to the user identity authentication record verification request.

9. The system according to claim 8, wherein the first smart contract and the second smart contract are the same smart contract.

10. The system according to claim 8, wherein the operations further comprise:
obtaining, through the second smart contract, a generation time indicating when the authentication result is generated, wherein the user identity authentication record further comprises the generation time.

11. The system according to claim 8, wherein the third smart contract and at least one of the first smart contract and the second smart contract are the same smart contract.

12. The system according to claim 8, wherein the operations further comprise:
obtaining identity information of a target user;
searching, from a plurality of the user identity authentication records stored in the blockchain based on the identity information of the target user, for one or more records that have positive authentication results;
obtaining user behavior data associated with the one or more records; and
calling a fourth smart contract for the fourth smart contract to determine a strategy for providing Internet service for the target user according to the user behavior data.

13. The system according to claim 12, wherein the fourth smart contract and at least one of the first smart contract and the second smart contract are the same smart contract.

14. A non-transitory computer-readable storage medium for blockchain-based identity authentication, configured with instructions executable by one or more processors to cause the one or more processors to perform operations comprising:
obtaining a user identity authentication request, the user identity authentication request comprising first to-be-authenticated biometric feature information of a user and to-be-authenticated identity information of the user, wherein the user identity authentication request is received from a server of a first service provider system;
querying, through a first smart contract in a blockchain, biometric feature information based on the to-be-authenticated identity information in a user identity data node in the blockchain;
obtaining, through the first smart contract, an authentication result by determining whether the biometric feature information is consistent with the first to-be-authenticated biometric feature information;
if the biometric feature information is consistent with the first to-be-authenticated biometric feature information, generating, through a second smart contract, a user identity authentication record comprising the first to-be-authenticated biometric feature information, the to-be-authenticated identity information, and the authentication result;
storing the user identity authentication record into the blockchain;
obtaining a user identity authentication record verification request from a server of a second service provider system, the user identity authentication record verification request comprising second to-be-authenticated identity information of the user and second to-be-authenticated biometric feature information of the user, wherein the second to-be-authenticated identity information of the user and the second to-be-authenticated biometric feature information of the user are sent from the server of the first service provider system to the server of the second service provider system;
searching, through a third smart contract, for a record from a plurality of the user identity authentication records stored in the blockchain based on the second to-be-authenticated identity information, wherein the record comprises a second biometric feature information;
determining, through the third smart contract, whether the second biometric feature information in the record is consistent with the second to-be-authenticated biometric feature information, and whether the authentication result is positive; and
if both determinations are positive, returning authentication success information to the user identity authentication record verification request, otherwise returning authentication failure information to the user identity authentication record verification request.

15. The storage medium according to claim 14, wherein the first smart contract and the second smart contract are the same smart contract.

16. The storage medium according to claim 14, wherein the operations further comprise:
obtaining, through the second smart contract, a generation time indicating when the authentication result is generated, wherein the user identity authentication record further comprises the generation time.

17. The storage medium according to claim 14, wherein the operations further comprise:
obtaining identity information of a target user;
searching, from a plurality of the user identity authentication records stored in the blockchain based on the identity information of the target user, for one or more records that have positive authentication results;
obtaining user behavior data associated with the one or more records; and
calling a fourth smart contract for the fourth smart contract to determine a strategy for providing Internet service for the target user according to the user behavior data.

* * * * *